United States Patent
Kazmi et al.

(10) Patent No.: US 10,517,102 B2
(45) Date of Patent: Dec. 24, 2019

(54) METHODS, NETWORK NODES, USER EQUIPMENT, AND COMPUTER PROGRAM PRODUCTS FOR ADAPTIVE RADIO LINK MONITORING

(71) Applicant: TELEFONAKTIEBOLAGET L M ERICSSON (PUBL), Stockholm (SE)

(72) Inventors: Muhammad Kazmi, Bromma (SE); Shaohua Li, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 631 days.

(21) Appl. No.: 14/408,741

(22) PCT Filed: Oct. 30, 2014

(86) PCT No.: PCT/SE2014/051282
§ 371 (c)(1),
(2) Date: Dec. 17, 2014

(87) PCT Pub. No.: WO2015/112072
PCT Pub. Date: Jul. 30, 2015

(65) Prior Publication Data
US 2016/0278103 A1    Sep. 22, 2016

Related U.S. Application Data

(60) Provisional application No. 61/931,983, filed on Jan. 27, 2014.

(51) Int. Cl.
*H04W 72/08* (2009.01)
*H04L 5/00* (2006.01)
*H04W 28/18* (2009.01)

(52) U.S. Cl.
CPC ......... *H04W 72/085* (2013.01); *H04L 5/0048* (2013.01); *H04L 5/0073* (2013.01); *H04W 28/18* (2013.01); *H04L 5/0091* (2013.01)

(58) Field of Classification Search
CPC ... H04L 5/0073; H04L 5/0048; H04L 5/0091; H04L 1/0026; H04W 72/085; H04W 28/18; H04W 24/10; H04W 72/042
See application file for complete search history.

(56) References Cited

U.S. PATENT DOCUMENTS

2007/0173279 A1* 7/2007 Kuroda ............. H04W 52/12
                                                    455/522
2010/0190447 A1  7/2010 Agrawal et al.
(Continued)

FOREIGN PATENT DOCUMENTS

EP    1928199 A2   6/2008
EP    2045989 A2   4/2009
(Continued)

OTHER PUBLICATIONS

Written Opinion of the International Searching Authority cited in PCT/SE2014/051282, dated Feb. 5, 2015, 6 pages.
(Continued)

*Primary Examiner* — Oussama Roudani
(74) *Attorney, Agent, or Firm* — Rothwell, Figg, Ernst & Manbeck, P.C.

(57) ABSTRACT

A method for adaptive radio link monitoring RLM) includes a network node obtaining configuration information about a user equipment (UE) receiver configuration associated with a UE, where the UE receiver configuration is implemented by the UE for receiving signals from the network node. The method further includes the network node adapting, based on the obtained configuration information, at least one radio transmission parameter associated with at least one downlink (DL) signal used by the UE for performing the RLM. The method also includes the network node transmitting the at least one DL signal with the adapted at least one parameter to the UE enabling the UE to perform the RLM.

38 Claims, 11 Drawing Sheets

(56) References Cited

U.S. PATENT DOCUMENTS

| | | | |
|---|---|---|---|
| 2011/0019715 A1* | 1/2011 | Brisebois | H04B 7/0626 375/130 |
| 2012/0224555 A1* | 9/2012 | Lee | H04W 52/143 370/329 |
| 2013/0044697 A1* | 2/2013 | Yoo | H04W 72/082 370/329 |
| 2013/0128932 A1 | 5/2013 | Huang et al. | |
| 2014/0098694 A1* | 4/2014 | Damji | H04W 52/0229 370/252 |
| 2015/0029951 A1* | 1/2015 | Sano | H04W 16/28 370/329 |

FOREIGN PATENT DOCUMENTS

| | | |
|---|---|---|
| KR | 10-2011-0110842 A | 10/2011 |
| RU | 2010136939 A | 3/2012 |

OTHER PUBLICATIONS

PCT International Search Report cited in PCT/SE2014/051282 dated Feb. 5, 2015, 3 pages.
Russian Decision of Grant issued in Application No. 2016134894107 (054501) dated Nov. 22, 2017, 17 pages.
Indian Office Action and English Translation, issued in corresponding Indian Patent Application No. 201637027915, dated May 29, 2019, 6 pages.

* cited by examiner

| Attribute | Value |
|---|---|
| DCI format | 1A |
| Number of control OFDM symbols | 2; Bandwidth ≥ 10 MHz<br>3; 3 MHz ≤ Bandwidth ≤ 10 MHz<br>4; Bandwidth = 1.4 MHz |
| Aggregation level (CCE) | 4; Bandwidth = 1.4 MHz<br>8; Bandwidth ≥ 3 MHz |
| Ratio of PDCCH RE energy to average RS RE energy | 4 dB; when single antenna port is used for cell-specific reference signal transmission by the PCell.<br>1 dB: when two or four antenna ports are used for cell-specific reference signal transmission by the PCell. |
| Ratio of PCFICH RE energy to average RS RE energy | 4 dB; when single antenna port is used for cell-specific reference signal transmission by the PCell.<br>1 dB: when two or four antenna ports are used for cell-specific reference signal transmission by the PCell. |

Table 1

FIG. 1  PRIOR ART

| Attribute | Value |
|---|---|
| DCI format | 1C |
| Number of control OFDM symbols | 2; Bandwidth ≥ 10 MHz<br>3; 3 MHz ≤ Bandwidth ≤ 10 MHz<br>4; Bandwidth = 1.4 MHz |
| Aggregation level (CCE) | 4 |
| Ratio of PDCCH RE energy to average RS RE energy | 0 dB; when single antenna port is used for cell-specific reference signal transmission by the PCell.<br>-3 dB; when two or four antenna ports are used for cell-specific reference signal transmission by the PCell. |
| Ratio of PCFICH RE energy to average RS RE energy | 4 dB; when single antenna port is used for cell-specific reference signal transmission by the PCell.<br>1 dB; when two or four antenna ports are used for cell-specific reference signal transmission by the PCell. |

Table 2

FIG. 2  PRIOR ART

METHODS, NETWORK NODES, USER EQUIPMENT, AND COMPUTER PROGRAM PRODUCTS FOR ADAPTIVE RADIO LINK MONITORING

CROSS REFERENCE TO RELATED APPLICATION(S)

This application is a 35 U.S.C. § 371 National Phase Entry Application from PCT/SE2014/051282 filed Oct. 30, 2014, which claims priority to U.S. Provisional Application No. 61/931,983, filed Jan. 27, 2014. The above identified applications are incorporated by reference in their entirety.

TECHNICAL FIELD

Disclosed herein are, for example, methods, network nodes, and computer program products for adaptive radio link monitoring (RLM).

BACKGROUND

Radio link monitoring (RLM), which is used by a user equipment (UE) to assess serving cell performance, is defined assuming a dual UE receiver implementation. The corresponding predefined and configurable parameters associated with RLM are used regardless of the UE receiver implementation and capability. However, UEs with a single receiver or with more than two receivers are expected to become available. The existing RLM procedures and parameter settings applied to these new UE receiver capabilities may incorrectly assess and detect the radio link problem.

A UE performs measurements on a serving cell (e.g., primary cell) in order to monitor the serving cell performance. This is called radio link monitoring (RLM) or RLM related measurements in LTE. For RLM, the UE monitors the downlink link quality based on the cell-specific reference signal in order to detect the downlink radio link quality of the serving or PCell.

In order to detect an out of sync (OOS) status and an in sync (IS) status, the UE compares the estimated DL signal quality of the serving cell with the thresholds Qout and Qin, respectively. The threshold Qout and Qin are defined as the level at which the downlink radio link cannot be reliably received and corresponds to 10% and 2% block error rate, respectively, of a hypothetical PDCCH transmissions. In non-DRX, downlink link quality for out of sync and in sync are estimated over evaluation periods of 200 ms and 100 ms respectively. In DRX, downlink link quality for out of sync and in sync are estimated over the same evaluation period, which scale with the DRX cycle. In addition to filtering on a physical layer (i.e. evaluation period), the UE also applies higher layer filtering based on network configured parameters. This increases the reliability of radio link failure detection (RLM) and thus, avoids unnecessary radio link failure and consequently RRC re-establishment. The UE declares RLF after the detection of a certain number of consecutive OOS and an expiration of a RLF timer.

A UE is required to meet the RLM (i.e. OOS and IS quality targets) provided the transmission parameters of PDCCH/PCFICH for OOS and IS detections are according to table 1 (FIG. 1) and table 2 (FIG. 2), respectively.

In LTE, the baseline UE receiver (interchangeably referred to as a radio receiver or radio chain or IFFT/FFT) is a dual receiver (e.g., 2-way receiver diversity). The UE requirements including RLM are defined assuming a dual receiver. In later releases (release 11 and onwards), more complex UE receivers (e.g., enhanced receiver) that can mitigate inter-cell interference are also introduced; but they still rely on dual receiver baseline architecture. The terms interference mitigation (IM) receiver, interference cancellation (IC) receiver, interference suppression receiver, interference rejection receiver, interference aware receiver, interference avoidance receiver, etc., are interchangeably used, but they all belong to a category of an advanced receiver or an enhanced receiver. The inter-cell interference mitigation refers to the receiver ability to mitigate the interference caused by at least certain signals received at the UE receiver from at least one interfering cell (e.g., aggressor cell). In release 12 or later, the UE requirements for single receiver and also for more than two receivers (e.g. 4-way receiver diversity) could be introduced. Examples of well-known receiver types are IC/IM, MMSE, MMSE-IRC, maximum likelihood (ML), successive interference cancellation (SIC), parallel interference cancellation (PIC) receiver or any combination thereof, etc. Examples of receiver types in terms of their ability to mitigate specific types of interfering signals are CRS-IM, PSS/SSS IC, PBCH IC, PDCCH IC, PDSCH IC receivers, etc.

Machine-to-machine (M2M) communication (e.g., machine type communication (MTC)) is used for establishing communication between machines and between machines and humans. This communication may comprise exchange of data, signaling, measurement data, configuration information, etc. The device size may vary from that of a wallet to that of a base station. The M2M devices are quite often used for applications like sensing environmental conditions (e.g. temperature reading), metering or measurement (e.g. electricity usage etc.), fault finding or error detection etc. In these applications, the M2M devices are seldom active, but over a consecutive duration depending upon the type of service, e.g., about 200 ms once every 2 seconds, about 500 ms every 60 minutes, etc. The M2M device may also perform measurements on other frequencies or other RATs.

One category of M2M devices is referred to as a low cost device category. For example, the cost reduction can be realized by having just a single receiver in the UE. The cost can be further reduced by having single receiver and half duplex FDD capability. The latter feature prevents the need for having duplex filter since UE does not transmit and receive at the same time. A low cost UE may also implement additional low cost features like, a downlink and an uplink maximum transport block size of (TBS) of 1000 bits and a reduced downlink channel bandwidth of 1.4 MHz for a data channel (e.g. PDSCH). For example, a low cost UE may comprise of a single receiver and one or more of the following additional features, HD-FDD, the downlink and/or uplink maximum transport block size of (TBS) of 1000 bits and the reduced downlink channel bandwidth of 1.4 MHz for data channel.

Another category of M2M devices is required to support enhanced UL and/or DL coverage. These devices are installed at locations where path loss between M2M device and the base station can be very large such as when used as a sensor or metering device located in a remote location such as a basement of a building. In such scenarios, the reception of a signal from a base station is very challenging. For example, the path loss can be worse than 15-20 dB compared to normal operation. In order to cope with such challenges, the coverage in an uplink direction and/or in a downlink direction has to be substantially enhanced. This can be realized by employing one or plurality of advanced techniques in the UE and/or in a radio network node for enhancing the coverage, e.g., boosting of DL transmit power, boosting of UL transmit power, enhanced UE receiver, signal repetition, etc.

The UE and a serving network node of the UE needs to comply with the radio link monitoring (RLM) requirements, which are predefined in the standard. These requirements are derived assuming that the UE has a dual receiver (aka 2-way receiver diversity). The RLM performance heavily affects the cell coverage. The network planning (e.g., cell size, distance between base station sites, etc.) also relies on the RLM performance in addition to other factors (e.g., base station power class). One type of low cost M2M devices comprises of a UE with a single receiver. The current RLM procedures and associated parameters used for dual UE receiver implementation may degrade the assessment of the serving cell performance. For example, the UE may lose its serving cell coverage but may not find another stronger cell, thereby getting lost in a coverage hole or dead cell zone. Similarly, the current RLM settings may not be appropriate for the high end UE having more than two receivers as these settings may cause the UE to over estimate serving cell performance. The problem is further accentuated when such a high end UE autonomously changes or is configured to adapt the number of receivers for actually receiving signals. In this case, the RLM behavior of the UE is unclear and the ambiguity may lead to serving cell performance degradation.

SUMMARY

According to some embodiments, a method for adaptive radio link monitoring RLM) includes a network node obtaining configuration information about a user equipment (UE) receiver configuration associated with a UE, where the UE receiver configuration is implemented by the UE for receiving signals from the network node. The method further includes the network node adapting, based on the obtained configuration information, at least one radio transmission parameter associated with at least one downlink (DL) signal used by the UE for performing the RLM. The method also includes the network node transmitting the at least one DL signal with the adapted at least one parameter to the UE enabling the UE to perform the RLM.

In some embodiments, the configuration information includes one or more of: maximum supported receivers, current number of receivers used for receiving DL signals, and an indication of an ability to mitigate the interference caused by interfering signal.

In some embodiments, the step of obtaining the configuration information comprises receiving said configuration information from the UE or determining the configuration information based on one or more radio measurements performed by the UE.

In some embodiments, the obtained configuration information indicates that the UE receiver is capable of at least one of: receiving signals with only a single receiver, and receiving signals with multiple receivers simultaneously.

In some embodiments, the obtained configuration information indicates that the UE receiver is capable of mitigating interference received from one or more interfering cells, wherein the mitigating of the interference received from one or more interfering cells includes mitigating interference received at the UE from at least one or more of: a DL data channel, a DL control channel, and DL physical signals.

In some embodiments, the at least one DL signal includes one or more of: a DL physical signal and a DL physical channel.

In some embodiments, the DL physical signal is one or more of: a Primary Synchronization Signal (PSS), a Secondary Synchronization Signal (SSS), a Cell specific Reference Signal (CRS), a Channel State Information Reference Signal (CSI-RS), and a Positioning Reference Signal (PRS).

In some embodiments, the DL physical channel is one or more of: a Physical Downlink Control Channel (PDCCH), a Physical Control Format Indicator Channel (PCFICH), Physical Hybrid ARQ Indicator Channel (PHICH), and an Enhanced Physical Downlink Control Channel (E-PDCCH).

In some embodiments, the DL physical channel is a Physical Downlink Shared Channel (PDSCH).

In some embodiments, the at least one radio transmission parameter includes one or more of: a transmit power of the DL signals, a ratio of energy or power of the DL signals to average energy or power of a reference signal, a number of OFDM symbols used for transmitting the DL signals, a format of the DL signals, an aggregation level of the DL signals, and a bandwidth of the DL signals.

In some embodiments, in response to determining that the UE indicates that the UE is capable of receiving signals with only a single receiver, the step of adapting the at least one radio transmission parameter includes at least one of: increasing a transmit power of the DL signals, increasing a ratio of energy or power of the DL signals to an average energy or power of a reference signal, increasing a number of OFDM symbols for transmitting the DL signals, selecting a format of the DL signals associated with reception of signals at the UE with only the signal receiver, increasing an aggregation level of the DL signals, and increasing repetitions of a same DL signal in the time domain.

In some embodiments, when the configuration information indicates that the UE is capable of receiving signals with multiple receivers and/or mitigating interference received from one or more interfering cells, the step of adapting the at least one radio transmission parameter includes at least one of: decreasing a transmit power of the DL signals, decreasing a ratio of energy or power of the DL signals to an average energy or power of a reference signal, decreasing a number of OFDM symbols for transmitting the DL signals, selecting a format of the DL signals associated with the reception of signals at the UE with multiple receiver and/or mitigation of interference received from one or more interfering cells, decreasing an aggregation level of the DL signals, and decreasing repetitions of a same DL signal in the time domain.

In some embodiments, the step of adapting the at least one radio transmission parameter enables the UE to maintain the same DL radio link out of sync quality target levels and in sync quality target levels regardless of the UE receiver capability of receiving the DL signals from the network node, wherein the out of sync quality target levels indicate one or more levels for declaring that a status of the UE is an out of sync status, and the in sync quality target levels indicate one or more levels for declaring that the status of the UE is an in sync status.

In some embodiments, the adaption of at the least one parameter related to the at least one DL signal is performed according to one or more predefined rules.

In some embodiments, the adaption is further based on whether DL coverage enhancement is applied on the DL signals transmitted by the network node for the UE.

In some embodiments, the obtained receiver configuration indicates that the UE supports a plurality of receiver types for receiving signals from the network node, and the network node configures (702) the UE to operate with one of the plurality of receiver types supported by the UE.

In some embodiments, the method further includes the network node determining (802), based on the obtained configuration information, whether the UE is operating in an enhanced coverage mode and the network node adapting (804), based on the determination that the UE is operating in the enhanced coverage mode, at least one radio transmission parameter associated with at least one downlink (DL) signal used by the UE for performing the RLM.

According to some embodiments, a network node for adaptive radio link monitoring (RLM) is arranged to obtain configuration information about a user equipment (UE) receiver configuration associated with a UE, where the UE receiver configuration implemented by the UE for receiving signals from the network node. The network node is further arranged to adapt, based on the obtained configuration information, at least one radio transmission parameter associated with at least one downlink (DL) signal used by the UE for performing the RLM. The network node is also arranged to transmit the at least one DL signal with the adapted at least one parameter to the UE enabling the UE to perform the RLM.

In some embodiments, the network node further comprises a processor, and a computer readable medium coupled to the processor, where the computer readable medium contains instructions executable by the processor.

In some embodiments, the configuration information includes one or more of maximum supported receivers, current number of receivers used for receiving DL signals, and an indication of an ability to mitigate the interference caused by interfering signal.

In some embodiments, the obtaining the configuration information comprises receiving said configuration information from the UE or determining the configuration information based on one or more radio measurements performed by the UE.

In some embodiments, the obtained configuration information indicates that the UE receiver is capable of at least one of: receiving signals with only a single receiver, and receiving signals with multiple receivers simultaneously.

In some embodiments, the obtained configuration information indicates that the UE receiver is capable of mitigating interference received from one or more interfering cells, wherein the mitigating of the interference received from one or more interfering cells includes mitigating interference received at the UE from at least one or more of: a DL data channel, a DL control channel, and DL physical signals.

In some embodiments, the at least one DL signal includes one or more of: a DL physical signal and a DL physical channel.

In some embodiments, the DL physical signal is one or more of: a Primary Synchronization Signal (PSS), a Secondary Synchronization Signal (SSS), a Cell specific Reference Signal (CRS), a Channel State Information Reference Signal (CSI-RS), and a Positioning Reference Signal (PRS).

In some embodiments, the DL physical channel is one or more of: a Physical Downlink Control Channel (PDCCH), a Physical Control Format Indicator Channel (PCFICH), Physical Hybrid ARQ Indicator Channel (PHICH), and an Enhanced Physical Downlink Control Channel (E-PDCCH).

In some embodiments, the DL physical channel is a Physical Downlink Shared Channel (PDSCH).

In some embodiments, the at least one radio transmission parameter includes one or more of: a transmit power of the DL signals, a ratio of energy or power of the DL signals to average energy or power of a reference signal, a number of OFDM symbols used for transmitting the DL signals, a format of the DL signals, an aggregation level of the DL signals, and a bandwidth of the DL signals.

In some embodiments, in response to determining that the UE indicates that the UE is capable of receiving signals with only a single receiver, the step of adapting the at least one radio transmission parameter includes at least one of: increasing a transmit power of the DL signals, increasing a ratio of energy or power of the DL signals to an average energy or power of a reference signal, increasing a number of OFDM symbols for transmitting the DL signals, selecting a format of the DL signals associated with reception of signals at the UE with only the signal receiver, increasing an aggregation level of the DL signals, and increasing repetitions of a same DL signal in the time domain.

In some embodiments, when the configuration information indicates that the UE is capable of receiving signals with multiple receivers and/or mitigating interference received from one or more interfering cells, the step of adapting the at least one radio transmission parameter includes at least one of: decreasing a transmit power of the DL signals, decreasing a ratio of energy or power of the DL signals to an average energy or power of a reference signal, decreasing a number of OFDM symbols for transmitting the DL signals, selecting a format of the DL signals associated with the reception of signals at the UE with multiple receiver and/or mitigation of interference received from one or more interfering cells, decreasing an aggregation level of the DL signals, and decreasing repetitions of a same DL signal in the time domain.

In some embodiments, the adapting the at least one radio transmission parameter enables the UE to maintain the same DL radio link out of sync quality target levels and in sync quality target levels regardless of the UE receiver capability of receiving the DL signals from the network node, wherein the out of sync quality target levels indicate one or more levels for declaring that a status of the UE is an out of sync status, and the in sync quality target levels indicate one or more levels for declaring that the status of the UE is an in sync status.

In some embodiments, the adaption of at the least one parameter related to the at least one DL signal is performed according to one or more predefined rules.

In some embodiments, the adaption is further based on whether DL coverage enhancement is applied on the DL signals transmitted by the network node for the UE.

In some embodiments, the obtained receiver configuration indicates that the UE supports a plurality of receiver types for receiving signals from the network node, and the network node configures the UE to operate with one of the plurality of receiver types supported by the UE.

In some embodiments, the network node is further arranged to determine, based on the obtained configuration information, whether the UE is operating in an enhanced coverage mode, and adapt, based on the determination that the UE is operating in the enhanced coverage mode, at least one radio transmission parameter associated with at least one downlink (DL) signal used by the UE for performing the RLM.

According to some embodiments, a computer product for adaptive radio link monitoring includes a non-transitory computer readable medium storing computer instructions for obtaining configuration information about a user equipment (UE) receiver configuration associated with a UE, where the UE receiver configuration is implemented by the UE for receiving signals from the network node. The readable medium further includes instructions for adapting, based on the obtained information, at least one radio transmission parameter associated with at least one downlink (DL) signal used by the UE for performing the RLM. The readable medium further includes instructions for transmitting the at least one DL signal with the adapted at least one parameter to the UE enabling the UE to perform the RLM.

According to some embodiments, a method for adaptive radio link monitoring includes a user equipment (UE) determining a receiver configuration based on a current number of receivers used by the UE for receiving down link (DL) signals from a network node and/or a currently used receiver type used for mitigating interference caused by an interfering signal. The method further includes the UE receiving, from the network node, at least one DL signal having at least one parameter adapted for use by the UE for performing the RLM depending upon a receiver capability of the UE used for receiving the DL signal. The method further includes performing RLM on a DL signal received from the network node. In some embodiments, the method further includes, in response to determining that a DL signal is adapted for use by the UE for the determined receiver configuration, substantially maintaining the same DL radio link out sync quality targets and in sync quality targets regardless of the UE receiver configuration.

In some embodiments, determination of the receiver configuration is further based on configuration information or a message received by the network node.

In some embodiments, the receiver type includes one or more of a receiver capable of receiving signals with only a single receiver, a receiver capable of receiving signals with multiple receivers simultaneously, and a receiver capable of mitigating interference received from one or more interfering cells.

In some embodiments, the method further comprises the UE determining if the UE is operating or configured to operate in DL coverage enhancement mode and the UE adapting one or more RLM related parameters or RLM procedures based on pre-determined rules, if operating in DL enhanced coverage node.

According to some embodiments, a User Equipment (UE), served by a network node for performing a radio link monitoring (RLM) by monitoring the downlink quality of signals transmitted by the network node, is arranged to determine a receiver configuration based on a current number of receivers used by the UE for receiving down link (DL) signals from a network node and/or a currently used receiver type used for mitigating interference caused by an interfering signal. The UE is further arranged to receive, from the network node, at least one DL signal having at least one parameter adapted for use by the UE for performing the RLM depending upon a receiver capability of the UE used for receiving the DL signal. The UE is further arranged to perform RLM on a DL signal received from the network node.

In some embodiments, the UE further comprises a processor, and a computer readable medium coupled to the processor, said computer readable medium containing instructions executable by the processor.

In some embodiments, the UE is further arranged to, in response to determining that a DL signal is adapted for use by the UE for the determined receiver configuration, substantially maintain the same DL radio link out sync quality targets and in sync quality targets regardless of the UE receiver configuration.

In some embodiments, the determination of the receiver configuration is further based on configuration information or a message received by the network node.

In some embodiments, the receiver type includes one or more of a receiver capable of receiving signals with only a single receiver, a receiver capable of receiving signals with multiple receivers simultaneously, and a receiver capable of mitigating interference received from one or more interfering cells.

In some embodiments, the UE is further arranged to determine if the UE is operating or configured to operate in DL coverage enhancement mode, and adapt one or more RLM related parameters or RLM procedures based on pre-determined rules, if operating in DL enhanced coverage node.

According to some embodiments, a computer product for managing a network node includes a non-transitory computer readable medium storing computer instructions for determining a receiver configuration based on a current number of receivers used by a user equipment (UE) for receiving down link (DL) signals from a network node and/or a currently used receiver type used for mitigating interference caused by an interfering signal. The readable medium further includes instructions for receiving, from the network node, at least one DL signal having at least one parameter adapted for use by the UE for performing the RLM depending upon a receiver capability of the UE used for receiving the DL signal. The readable medium further includes instructions for performing RLM on a DL signal received from the network node.

Embodiments provide that a serving network node of a UE adapts one or more radio transmission parameters of DL signals used by the UE for performing RLM operation, wherein the adaptation is based on UE receiver configuration and is done to ensure that consistent DL radio link performance of serving cell is achieved regardless of the UE receiver configuration. The adaptation may be realized according to predefined rules.

According to some embodiments, a network node serving a UE obtains a receiver configuration of the UE in terms of a number of receivers supported by the UE and/or currently used or supported receiver type in terms of its ability to mitigate interference and/or number of receivers actually or currently used by the UE for receiving DL signals for performing radio link monitoring (RLM). The network node adapts one or more radio transmission parameters of one or more DL signals used by the UE for the RLM, wherein the adaptation is based on the obtained UE receiver configuration according to predefined rule(s) or autonomously. The network node also transmits the adapted DL radio signals enabling the UE to perform the RLM.

The network node may further adapt one or more radio transmission parameters if the network node determines that an enhanced coverage mode operation is used to enhance the reception quality of DL signals at the UE.

According to some embodiments, a UE served by a network node determines a current receiver configuration of the UE in terms of currently used receiver type in terms of its ability to mitigate interference and/or number of receivers actually or currently used for receiving DL radio signals for performing RLM. The UE receives DL radio signals from a first cell served by the network node, wherein radio transmission parameters related to the DL signals used for RLM by the UE are adapted by the network node according to the UE receiver configuration. The UE performs RLM of the first cell based on the said adapted DL radio signals received from the first cell, while maintaining or using the same DL radio link quality targets for the detection of out of sync and in sync regardless of the UE receiver configuration, and meeting one or more predefined requirements associated with RLM.

BRIEF DESCRIPTION OF THE DRAWINGS

The accompanying drawings, which are incorporated herein and form part of the specification, illustrate various embodiments.

FIGS. 1 and 2 illustrate tables for RLM.

DETAILED DESCRIPTION

Figure 3:
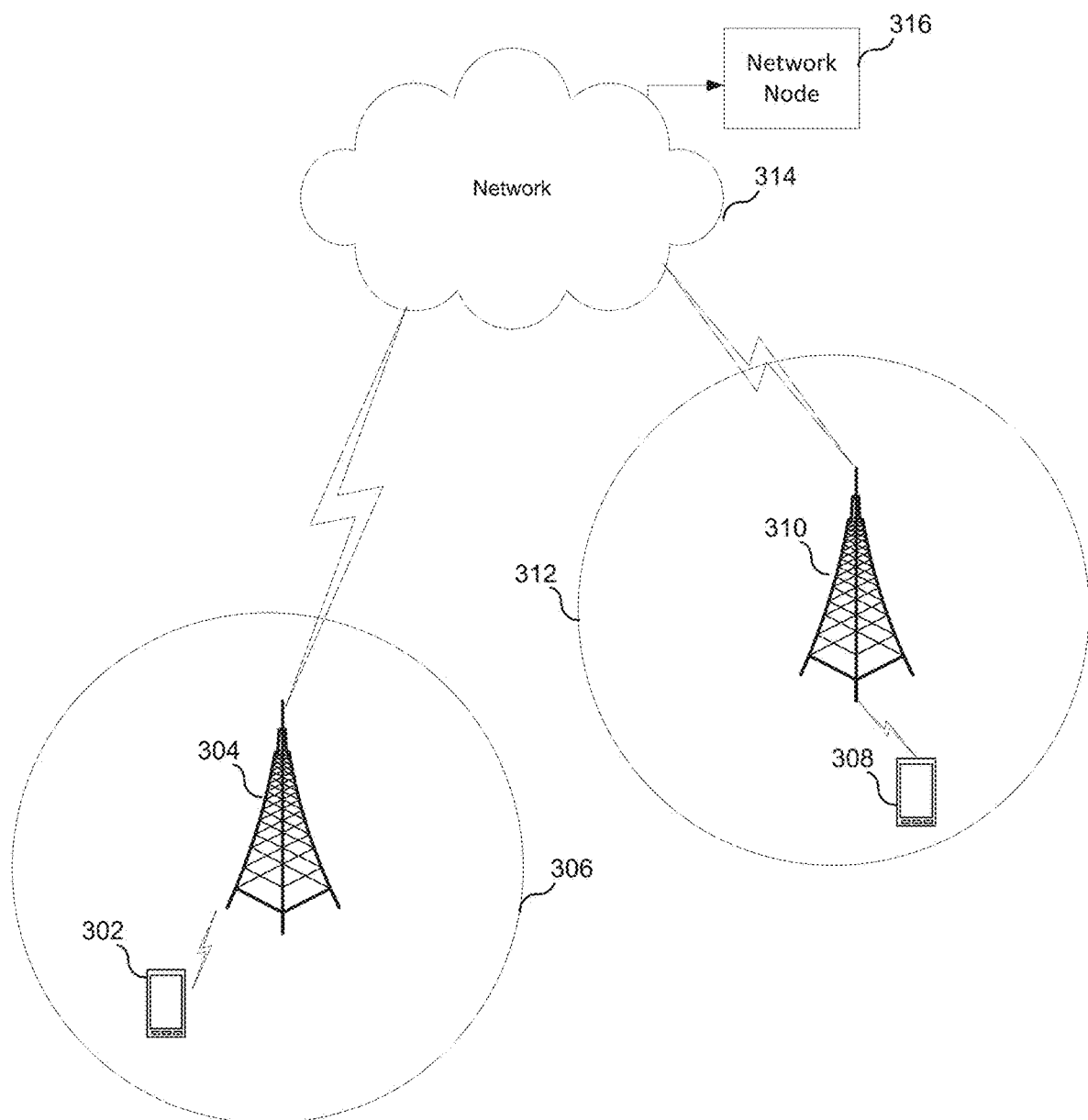
FIG. 3 illustrates an exemplary wireless communication system according to some embodiments.

FIG. 3 illustrates an embodiment of a wireless communication system 300, which includes UEs 302 and 308 in communication with base stations 304 and 310, respectively. Base stations 304 and 310 provide coverage for cells 306 and 312, respectively. Cells 306 and 312 may operate with frequencies f1 and f2, respectively. The base stations 304 and 314 are in communication with a control node 316 via a network 314. The network node 316 may be any network node such as a Radio Network Controller (RNC), a Mobility Management Entity (MME), a Mobile Switching Center (MSC) or Base Station Subsystem (BSS).

In some embodiments, the non-limiting term UE is used. The UE herein can be any type of wireless device capable of communicating with a network node or another UE over radio signals. The UE may also be a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also, in some embodiments, generic terminology such as "radio network node" or simply "network node (NW node)," is used. The network node can be any kind of network node which may comprise of a base station, radio base station, base transceiver station, base station controller, network controller, evolved Node B (eNB), Node B, relay node, access point, radio access point, Remote Radio Unit (RRU) Remote Radio Head (RRH), etc.

The embodiments are described using LTE concepts. However, the embodiments are applicable to any RAT or multi-RAT systems, where the UE regularly assess the serving cell performance by the virtue of the RLM procedure, or equivalent procedures, e.g., LTE FDD/TDD, WCDMA/HSPA, GSM/GERAN, Wi Fi, CDMA2000 etc.

Some embodiments include a scenario involving adapting RLM related parameters accounting for UE receiver capability. Some embodiments include a method in a network node for adapting RLM related radio transmission parameter(s) accounting for UE receiver capability. Some embodiments include a method in a UE for adapting RLM related parameter(s) accounting for UE receiver capability.

A scenario includes at least one UE served by a first cell (e.g., serving cell or PCell of the UE) managed by a network node. The first cell operates on a first carrier frequency (f1). The UE regularly evaluates out of sync (OOS) and in sync (IS) based on DL radio signals received from the first cell to assess its DL radio quality for the purpose of radio link monitoring of the first cell. If the radio link failure occurs (e.g., due to consecutive IS detection) then the UE initiates RRC connection to a second cell, which may belong to the carrier f1 or to another carrier f2. The carrier f1 and carrier f2 may belong to a same RAT or even a different RAT. In order to ensure that the UE is able to correctly receive signals (e.g., DL control channels such as PDCCH/PCFICH) the network node need to ensure that the radio transmission parameters associated with the DL control channels are according to the predefined requirements related to RLM.

Unlike existing systems, where all UEs have dual receivers, the UE herein may have any number of receivers (Rx) ranging from 1 to N (e.g., typically between 1-4 Rx). Furthermore, the UE with multiple Rx may use any number of receivers ranging between 1 Rx to N Rx for receiving DL signals from at least the serving cell. The UE may autonomously change the number of receivers to be used or the UE may be configured by the network node. Furthermore, the autonomous operation to modify the number of receivers to be used can also be based on predefined conditions or rules. For example, the UE may use N-M Rx (where M<N) if signal quality is above certain threshold.

Figure 4:
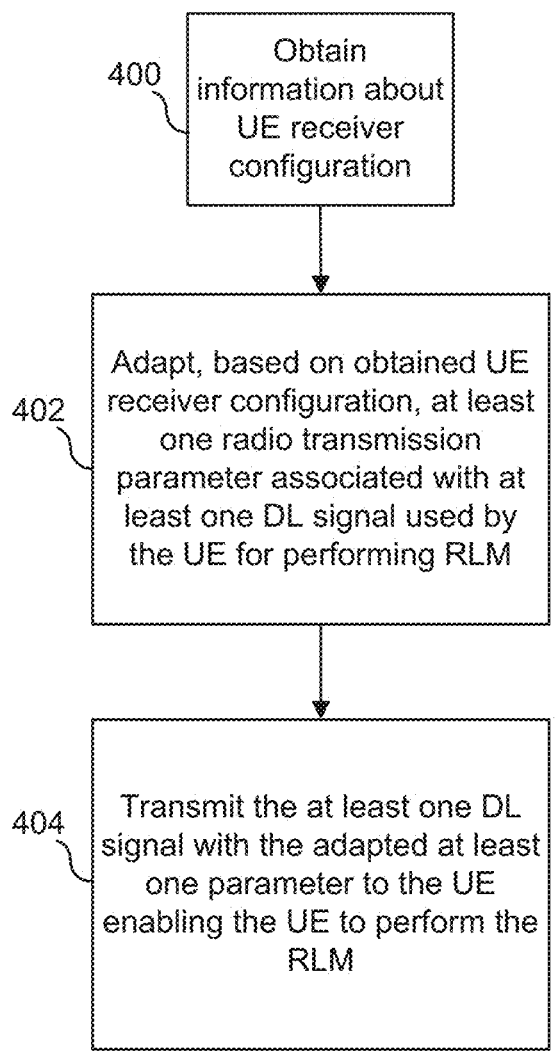
FIG. 4 is a flow chart illustrating a process according to some embodiments.

According to some embodiments, a method in the network node operates according to the scenario described above. The method can be expressed in terms of rules, which can be predefined in the standard and applied by the network node, which configures the UE to perform RLM. FIG. 4 illustrates an exemplary flow chart for implementing the method. The steps in the network node described below can be performed in the network node in a specific order or in any order or sequence.

The process may start at 400, where the network node obtains information about the UE receiver configuration. In this regard, the network node obtains, determines, or identifies the UE receiver configuration. The UE receiver configuration may comprise of a UE receiver capability, which is the maximum number of receivers supported by the UE, or the supported receiver type, and a current number of receivers used or currently used receiver type by the UE for receiving the DL signals. The term receiver configuration may be expressed in terms of number of receivers supported or used by the UE for receiving downlink signals from the first cell, e.g., for doing radio link monitoring. In another example, the receiver configuration can be determined in terms of the receiver type currently used for mitigating interference caused by one or more type of radio signals. The interfering signals may be received at the UE from the serving cell and/or from one or more interfering cells. In another example, the receiver configuration may comprise of combination of the two exemplary receiver configurations mentioned above (i.e., number of receivers and receiver type).

In some embodiments, the determination in step 400 may be based on explicit information. For example, the network node receives explicit information about receiver configuration from the UE, or from another network node which contains this information (e.g., previously serving network node of the UE). The network node may also configure the UE with certain number of receivers in case the network node knows the UE receiver capability. In this case, the network node retrieves the configured information to determine the UE receiver configuration.

In some embodiments, the determination in step 400 may be based on implicit information. For example, the network node may determine the UE receiver configuration based on a predefined rule and/or UE radio measurement results (e.g., DL signal quality such as RSRQ or RSRP). An example of a predefined rule is that the UE may adapt its receiver configuration depending upon the signal quality, e.g., the UE may use fewer receivers if serving cell performance is better than the target, e.g., HARQ BLER is below threshold such as <1%. In another example, if the UE reported radio measurement results (e.g., RSRQ) above a threshold, then the network node may assume that higher signal quality is due to the fact that the UE is using all its receivers or more than one receiver.

According to some embodiments, the determination in step 400 may be based on both explicit and implicit information. For example, the network node may receive explicit information about the UE receiver configuration (e.g., maximum supported receivers). However, the actual number of receivers used currently by the UE is determined implicitly, e.g., based on UE measurement reports.

Figure 5:
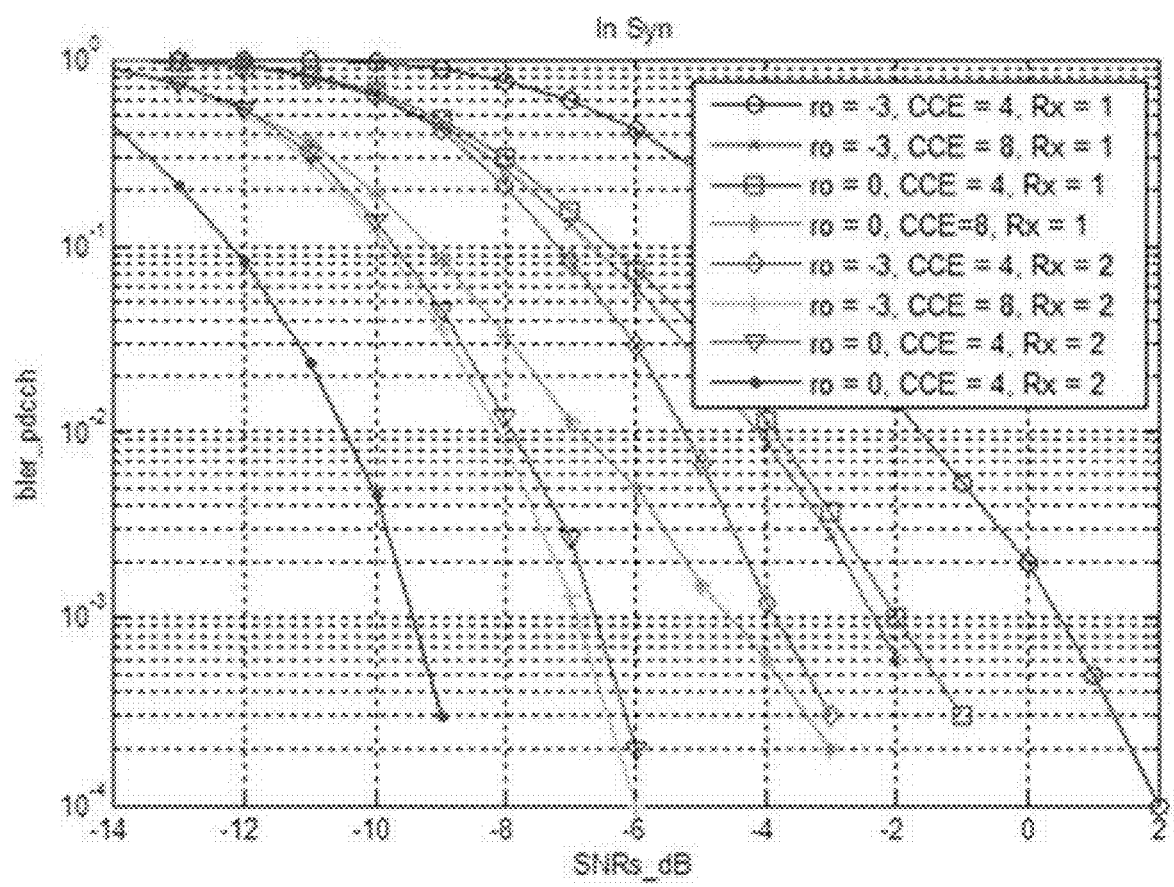
FIGS. 5 and 6 illustrate charts for in synch and out synch, respectively.
Figure 6:
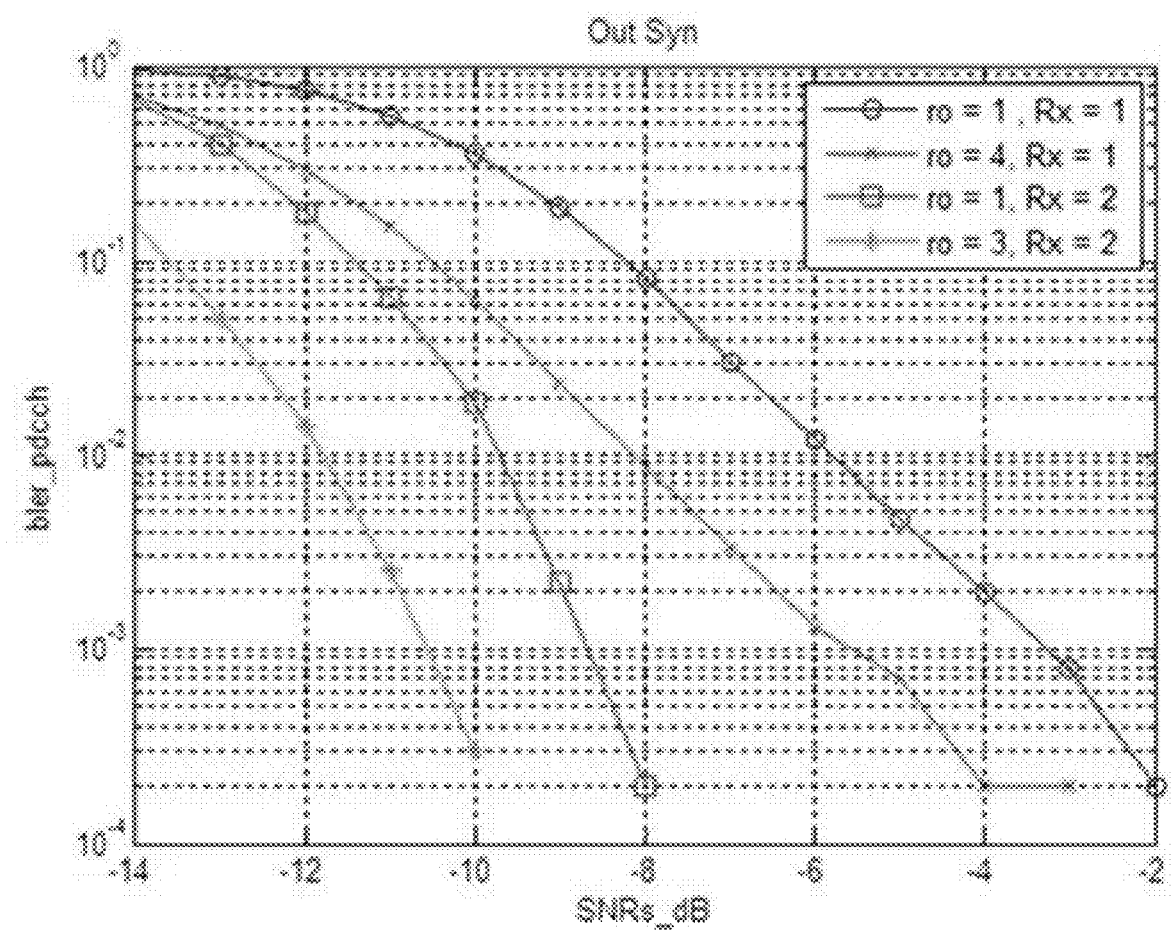

The process proceeds from step 400 to 402 where the network node adapts, based on the obtained UE receiver configuration, at least one radio transmission parameter associated with at least one DL signal used by the UE for performing RLM. For example, in this step, the network node adapts one or more radio transmission parameters associated with at least one downlink signal used by the UE for performing the radio link monitoring (RLM). The adaptation is performed in order to enable the UE to meet one or more predetermined requirements related to RLM and thereby, ensure that the DL serving cell quality stays within acceptable limits. For example, as shown in FIGS. 5 and 6, for both OOS and IS detection, the DL transmit power is to be increased by a certain amount for 1 Rx compared to 2 Rx. Adaptation of additional parameters may also be needed to achieve the same quality thresholds for 1 Rx and 2 Rx UE implementation or configuration.

Examples of radio transmission parameters include, but are not limited to, transmit power of DL signals, ratio of energy or power of DL signals to average energy or power of a reference signal (e.g., CRS), number of OFDM symbols used for transmitting DL signals, format of the DL signals (e.g., downlink control channel information (DCI) format of DL channels), aggregation level of DL signals (e.g., number of control channel element (CCE)), bandwidth of DL signals, and number of repetitions of the same signal in the time domain. DCI formats differ by their processing structure and their information contents. The former is characterized by element multiplexing, CRC attachment, channel coding, rate matching. The latter comprises of downlink or uplink scheduling information, requests for aperiodic CQI reports, etc.

Examples of predefined requirements include, but are not limited to, out of sync quality target in terms of hypothetical BLER of DL control channel (e.g., PCFICH/PDCCH) and/ or SNR, in sync quality target terms of hypothetical BLER of DL control channel and/or SNR, evaluation periods for determining signal quality for detection of OSS and IS, etc. Examples of OOS and IN BLER targets to be met by the UE are 10% and 2%, respectively.

The adaptation step may be performed according to predefined rules, or may also be autonomously decided by the network node (e.g., based on UE downlink signal quality or performance such as UE radio measurements, BLER, etc.). When using the predefined rule, the parameters and their values are specified in the standard as a function of at least the UE receiver configurations. In one example, two different sets of parameter values can be predefined: one for single Rx and another one for dual Rx. In another example, three different sets of parameter values can be predefined: one for single Rx, another one for dual Rx and another one for 4 Rx. The network node subsequently selects the set of radio transmission parameters depending upon the UE receiver configuration.

The process proceeds from step 402 to step 404 where the network node transmits the at least one DL signal with the adapted at least one parameter to the UE enabling the UE to perform the RLM. For example, the network node transmits the DL signals based on one or more adaptive radio transmission parameters. The transmitted DL signals are used by the UE for evaluating a radio quality of the cell of the network node for the purpose of RLM. The DL signals can be one or more DL physical signals and/or one or more DL physical channels. Examples of DL physical signals are PSS, SSSS, CRS, CSI-RS and PRS. Examples of DL physical channels are PDSCH, PDCCH, PCFICH, PHICH or E-PDCCH.

According to some embodiments, the network node may perform adaptation based on radio operational mode. For example, the network node may further determine whether the UE is configured to operate in a certain radio operational mode or not. A radio operational mode herein refers to the extent to which a signal can be received at the receiver from a radio transmitter. An example of radio operational mode is an enhanced coverage mode or enhanced coverage mode of operation. In this step, the network node determines whether the UE is operating in DL enhanced coverage mode. In enhanced coverage mode, the transmission of one or more DL signals is enhanced by signal repetition and/or increasing the transmit power of DL signals. The enhanced coverage mode enhances the reception quality of the DL signals received at the UE thus, enabling the UE to receive the signal even if the path loss is larger than usual (e.g., 10-20 dB more than in normal operation). If the UE is operating in enhanced coverage mode (e.g., for M2M communication), then the network node may take into account the enhanced coverage operation of the UE to further adapt one or more radio transmission parameters of the DL signals received by the UE. The adaptation level may depend upon the amount of enhanced coverage. The adaptation may also be, for example, reducing the number of symbols from 3 to 2 for transmitting the DL control channel if the DL control channel (e.g., PDCCH) to be received by the UE is repeated over certain subframes (e.g., 10 subframes) to enhance coverage by certain margin (e.g., 10 dB increase in DL path loss compared to normal operation where no signal repetition is used). The adaptation of parameters depending upon coverage enhancement may also be performed by the network node according to predefined rules or autonomously.

According to some embodiments, the network node sends a request to obtain UE receiver configuration. For example, the network node sends an explicit request to the UE to report its receiver configuration, which comprises of its receiver capability and/or number of receivers currently used or activated by the UE for receiving DL signals. The request or message may be sent via RRC signaling. The request may be sent at the call setup or after cell change of the UE or periodically or anytime when the network node needs updated information.

According to some embodiments, the network node configures UE receivers. For example, if the UE supports more than one receiver, then the network node may decide to modify the UE receiver configuration via higher layer signaling. Alternatively the network node may recommend the UE to change the UE receiver configuration. The decision to modify the receiver configuration or send the corresponding recommendation could be based on UE radio performance (e.g., serving cell performance, UE radio measurement results, etc.). For example, if serving cell performance such as DL BLER of PDSCH is above a threshold (e.g. <1%) over a certain amount of time, then the network node may decide to reduce the number of receivers to be used for DL reception (e.g., from 4 to 3 Rx). This in turn will enable the UE to reduce its power consumption and extend its battery life.

In some embodiments, the values of the parameters to be adapted or selected by the network node depend upon the determined number of receivers supported and/or currently used by the UE for receiving one or more DL signals from the at least first cell (i.e., serving cell), which is explained with the following examples.

In one example if the UE receiver configuration comprises of one receiver then the network node adapts the DL signals by: (i) increasing transmit power of DL signals with respect to reference value; (ii) increasing the ratio of energy or power of DL signals to average energy or power of reference signal, compared to reference value; (iii) increasing the number of OFDM symbols for transmitting DL signals compared to reference value; (iv) selecting the format of the DL signals (e.g. DCI format of PCFICH/PDCCH) associated with the reception of signals at the UE with only signal receiver; (v) increasing the aggregation level of DL signals compared to reference value; or (vi) increasing the repetitions of the same DL signal (e.g. PDCCH, PBCH, CRS etc.) in time domain compared to a first reference value (e.g. first reference value=no repetition, one repetition, etc.).

In another example, if the UE receiver configuration comprises of more than two receivers, then the network node adapts the DL signals by (i) decreasing transmit power of DL signals with respect to reference value; (ii) decreasing the ratio of energy or power of DL signals to average energy or power of reference signal, compared to reference value; (iii) decreasing the number of OFDM symbols for transmitting DL signals compared to reference value; (iv) selecting the format of the DL signals (e.g. DCI format of PCFICH/PDCCH) associated with the reception of signals at the UE with the determined receiver configuration; (v) decreasing the aggregation level of DL signals compared to reference value; or (vi) decreasing the repetitions of the same DL signal in time domain compared to a second reference value (e.g., second reference value=5, 10 etc.).

In the above examples, the reference value corresponds to the value of the parameter used for transmitting DL signals when UE receiver configuration comprises of certain reference configuration e.g. dual receiver (e.g., receiver diversity).

Figure 7:
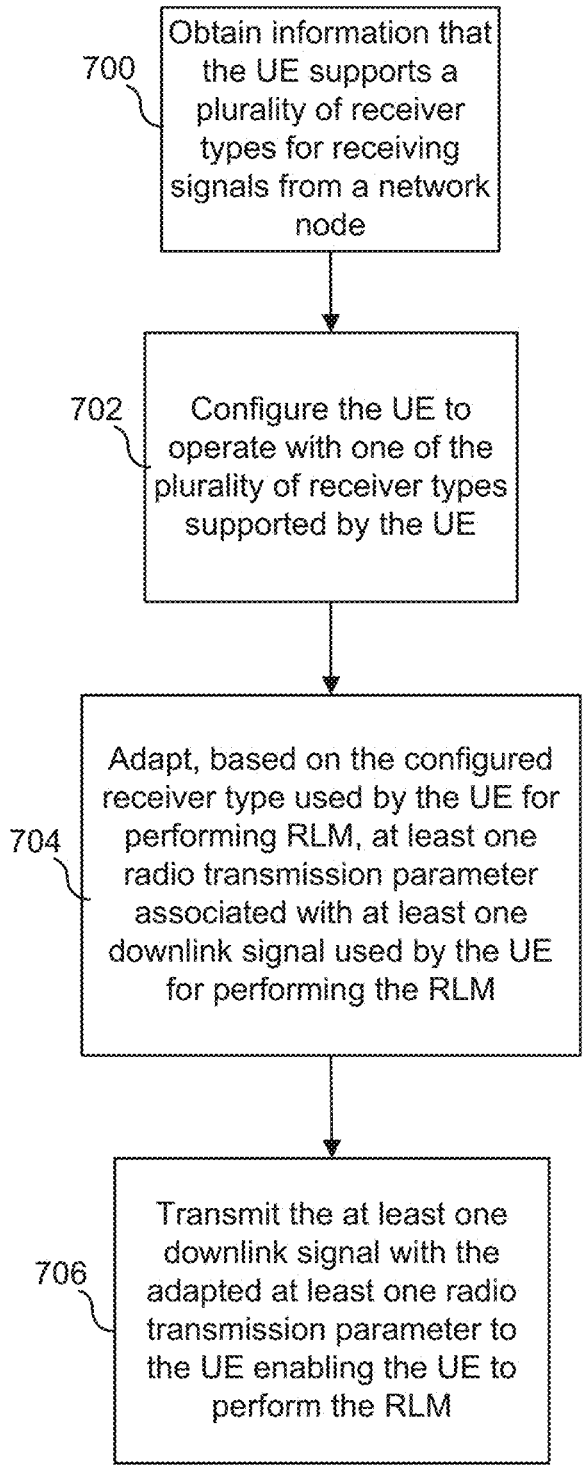
FIG. 7 is a flow chart illustrating a process according to some embodiments.

FIG. 7 illustrates an embodiment of a process performed by the network node. The process may start at 700 where the network node obtains information that the UE supports a plurality of receiver types for receiving signals from a network node. The process proceeds to 702 where the network node configures the UE to operate with one of the plurality of receiver types supported by the UE. The process proceeds to step 704 where the network node adapts, based on the configured receiver type used by the UE for performing RLM, at least one radio transmission parameter associated with at least on downlink signal used by the UE for performing the RLM. The process proceeds to step 706 where the network node transmits the at least one downlink signal with the adapted at least one radio transmission parameter to the UE enabling the UE to perform the RLM.

Figure 8:
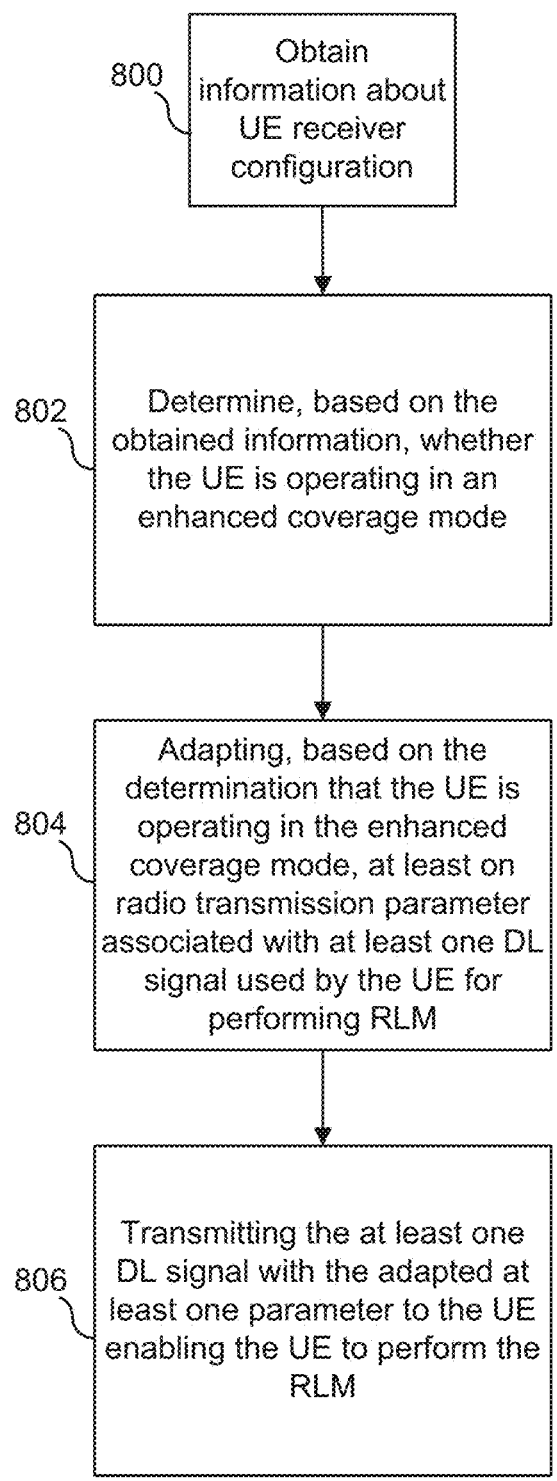
FIG. 8 is a flow chart illustrating a process according to some embodiments.

FIG. 8 illustrates an embodiment of another process performed by the network node. The process may start at 800 where the network node obtains information about a UE receiver configuration associated with the UE. The process proceeds to step 802 where the network node determines, based on the obtained information, whether the UE is operating in an enhanced coverage mode. The process proceeds to step 804 where the network node adapts, based on the determination that the UE is operating in the enhanced coverage mode, at least one radio transmission parameter associated with at least one downlink (DL) signal used by the UE for performing the RLM. The process proceeds to step 806 where the network node transmits the at least one DL signal with the adapted at least one parameter to the UE enabling the UE to perform the RLM.

Figure 9:
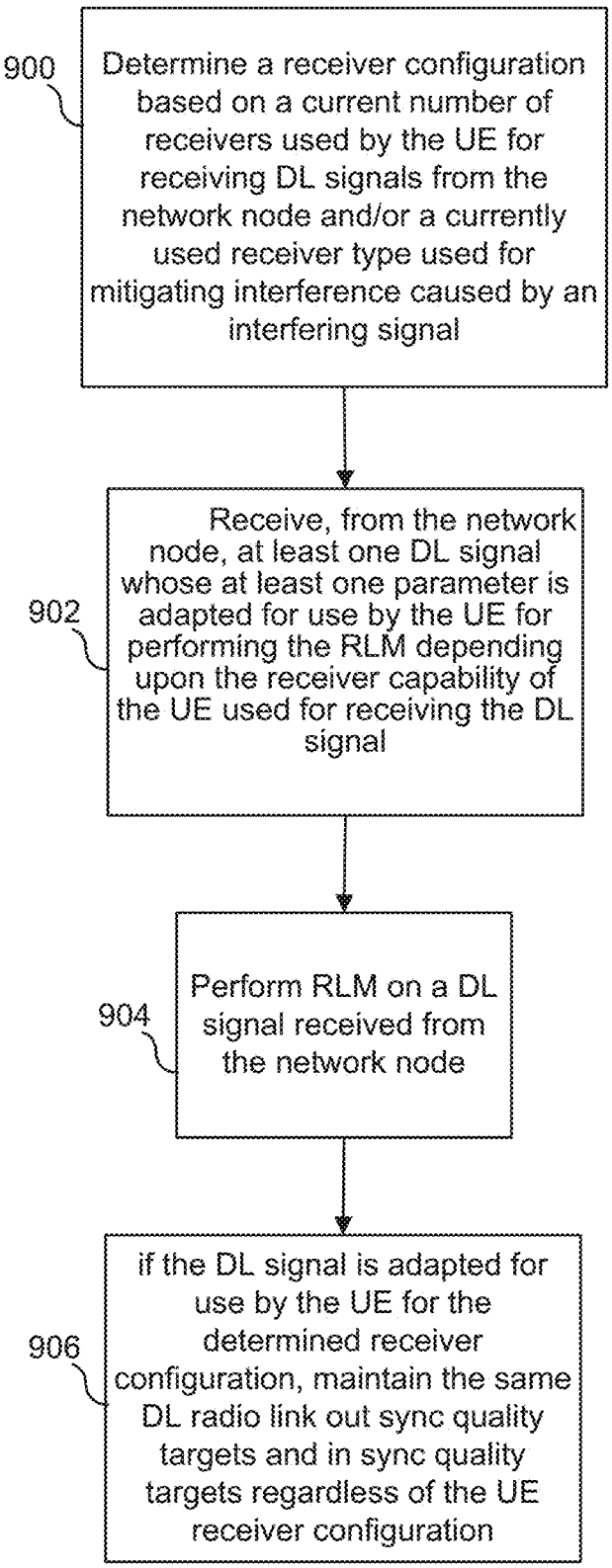
FIG. 9 is a flow chart illustrating a process according to some embodiments.

FIG. 9 illustrates an embodiment of a process performed by the UE. This embodiment can be correlated with the UE operating in the scenario described above in which the UE is server by a first cell managed by the network node, where the first cell operates on a first carrier frequency (f1). This process may be expressed in terms of rules which can be predefined in the standard and applied by the UE when performing RLM. The steps in the UE described below can be performed in the UE in a specific order or in any order or sequence.

The process may generally start at step 900 where the UE determines a receiver configuration based on a current number of receivers used by the UE for receiving DL signals from the network node and/or a currently used receiver type used for mitigating interference caused by an interfering signal. In this step, the UE determines or identifies or obtains information about its own receiver configuration.

In one example, the receiver configuration can be determined in terms of number of receivers currently used by the UE for receiving downlink signals from the first cell (e.g., for doing radio link monitoring). In another example, the receiver configuration can be determined in terms of receiver type currently used for mitigating interference caused by one or more type of DL signals. Examples of receiver types are intra-cell interference mitigation receiver, inter-cell interference mitigation receivers etc. The interfering signals may be received from the serving cell and/or from one or more interfering cells. In another example, the receiver configuration may comprise of combination of the two receiver configurations mentioned above. The UE may determine the receiver configuration related information by one or more of the following means: retrieving the information stored in the memory, by actually checking the receivers which are actively receiving DL signals and receiver configuration performed by the network node. It is assumed that the UE may support 2 or more receivers for receiving DL signals.

The process proceeds from step 900 to step 902 where the UE receives, from the network node, at least one DL signal whose at least one parameter is adapted for use by the UE for performing the RLM depending upon the receiver capability of the UE used for receiving the DL signal. In this step, the UE may receive, from the first cell, DL signals which the UE receives using all the activated or currently configured receivers. The UE may also determine if the received one or more DL signals have been adapted by the network node depending upon UE receiver configuration. The determination can be performed according to predefined rules as described in Step 402 of FIG. 4. The DL signals that can be adapted are described with respect to step 404 of FIG. 4.

The process proceeds from step 902 to 904 where the UE performs RLM on a DL signal received from the network node. In step 906, if the DL signal is adapted for use by the UE for the determined receiver configuration, the UE maintains the same DL radio link out sync quality targets and in sync quality targets regardless of the UE receiver configuration. In these steps, the UE may use the received DL signals for evaluating DL signal quality of the first cell for the purpose of performing RLM operation (e.g. OOS, IS detection, etc.). If the radio transmission parameters of DL received signals used by the UE for doing RLM are adapted by the network node according to one or more predefined rules, then the UE maintains or uses the same DL radio link quality targets for the detection of out of sync and in sync regardless of the UE receiver configuration, and also meets one or more predefined requirements associated with RLM (e.g., OOS/IS detection over predefined evaluation periods, etc.) Otherwise, if the radio transmission parameters of the DL signals used for RLM are not adapted by the network node according to predetermined rules, then the UE may not perform RLM, or it may not meet the predefined requirements related to RLM.

For example, for any receiver configuration (1 Rx or 2 Rx) for the detection of OOS and IS, the UE uses the SNR levels corresponding to the same values of 10% PDCCH hypothetical BLER and 2% hypothetical BLER, respectively. The UE then compares these SNR levels with the measured DL quality on DL received signals (e.g. CRS) to detect whether OOS or IS occurs.

In some embodiments, the UE may inform the network node about the UE's receiver configuration, which may comprise of the UE's receiver capability and/or current number of receivers used for receiving DL signals and/or type of receiver currently used for receiving DL signals. The UE may signal this information autonomously or in response to request received from the network node.

According to some embodiments, the UE adapts RLM based on whether the UE is operating in a certain radio operational mode. As an example, the UE determines whether it operates in the DL coverage enhancement mode. The determination can be based on whether the UE has been configured to operate in enhanced coverage mode, or the UE can detect if one or more DL signal is enhanced (e.g., repeated multiple times, transmitted with boosted power etc.). The UE may further determine if the network node has also adapted one or more radio transmission parameters of DL signals transmitted by the first cell when enhanced coverage is used. The UE may apply one or more of the following described rules related to RLM.

In some embodiments, if the UE is determined to be operating in enhanced coverage mode, or if the enhanced coverage is above a threshold (e.g., 10 dB or more of increase in DL path loss compared to normal operation), then the UE may further adapt one or more parameters used for performing RLM. For example, the UE may measure DL signal quality of DL received signals for evaluation of OSS and IS according to predetermined requirements corresponding to enhanced coverage mode (e.g., over evaluation period) which is longer than the evaluation period used in normal operation (i.e., without enhanced coverage mode).

In some embodiments, the UE uses the legacy DL radio link quality targets for the detection of out of sync and in sync provided the UE determines that radio transmission parameters of DL signals used for RLM are adapted by the network node to account for enhanced coverage mode of operation. The legacy DL radio link quality targets are the ones used when no enhanced coverage is applied on DL radio signals.

In some embodiments, if the UE determines that radio transmission parameters of DL signals used for RLM are NOT adapted by the network node according to predetermined rules when enhanced coverage is used, then the UE may not perform RLM, or the UE may not meet the predefined requirements related to RLM.

According to some embodiments, the UE informs the network node about inadequate RLM operation. For example, if the radio transmission parameters related to the DL signals are not adapted by the network node (to account for UE receiver configuration and/or DL coverage enhancement) as determined by the UE, then the UE may also inform the network node that the UE is unable to perform RLM, is unable to meet predetermined requirements related to RLM, or cannot guarantee to meet the serving cell performance, e.g., target BLER, etc. The UE may also indicate the reason for inadequate RLM operation, e.g., due to lack of adaptation of radio transmission parameters of DL signals by the network node.

Figure 10:
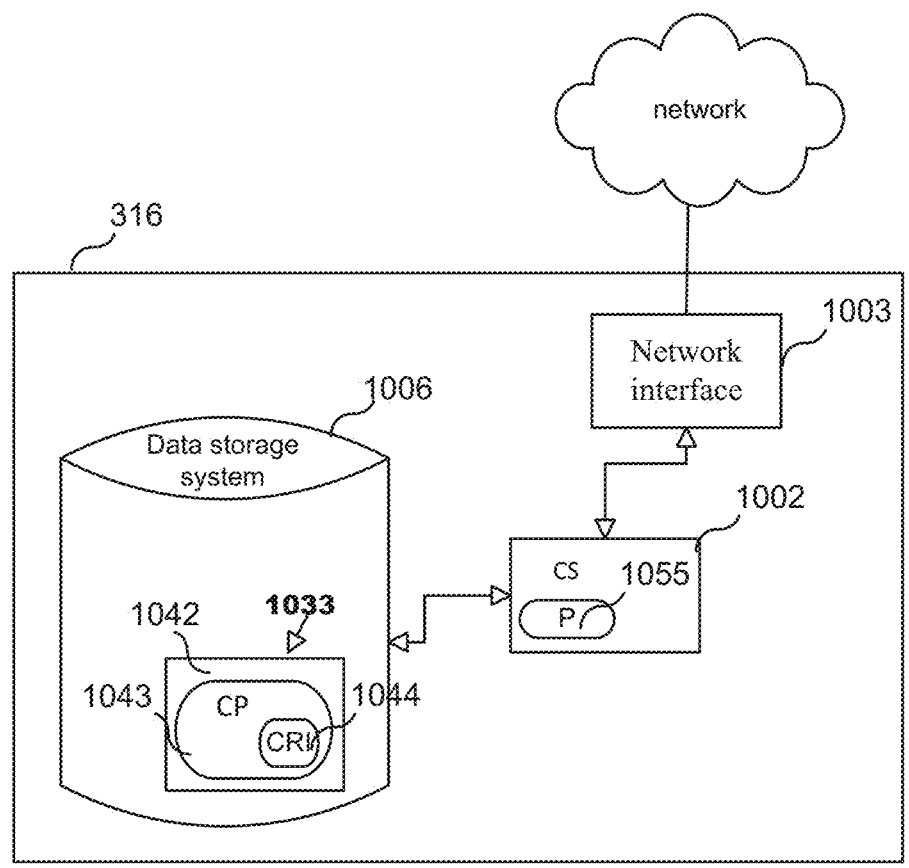
FIG. 10 is a block diagram of a control node according to some embodiments.

FIG. 10 is a block diagram of an embodiment of network node 316. As shown in FIG. 10, network node 316 may include or consist of: a computer system (CS) 1002, which may include one or more processors 1055, e.g., a general purpose microprocessor and/or one or more circuits, such as an application specific integrated circuit (ASIC), field-programmable gate arrays (FPGAs), a logic circuit, and the like; a network interface 1003 for use in connecting network node 316 to a network; and a data storage system 1006, which may include one or more non-volatile storage devices and/or one or more volatile storage devices, e.g., random access memory (RAM). In embodiments where network node 316 includes a processor 1055, a computer program product (CPP) 1033 may be provided. CPP 1033 includes or is a computer readable medium (CRM) 1042 storing a computer program (CP) 1043 comprising computer readable instructions (CRI) 1044. CRM 1042 is a non-transitory computer readable medium, such as, but not limited, to magnetic media, e.g., a hard disk, optical media, e.g., a DVD, solid state devices, e.g., random access memory (RAM), flash memory, and the like. In some embodiments, the CRI 1044 of computer program 1043 is configured such that when executed by computer system 1002, the CRI causes the network node 316 to perform steps described above, e.g., steps described above with reference to the flow charts and message flows shown in the drawings. In other embodiments, network node 316 may be configured to perform steps described herein without the need for a computer program. That is, for example, computer system 1002 may consist merely of one or more ASICs. Hence, the features of the embodiments described herein may be implemented in hardware and/or software.

Figure 11:
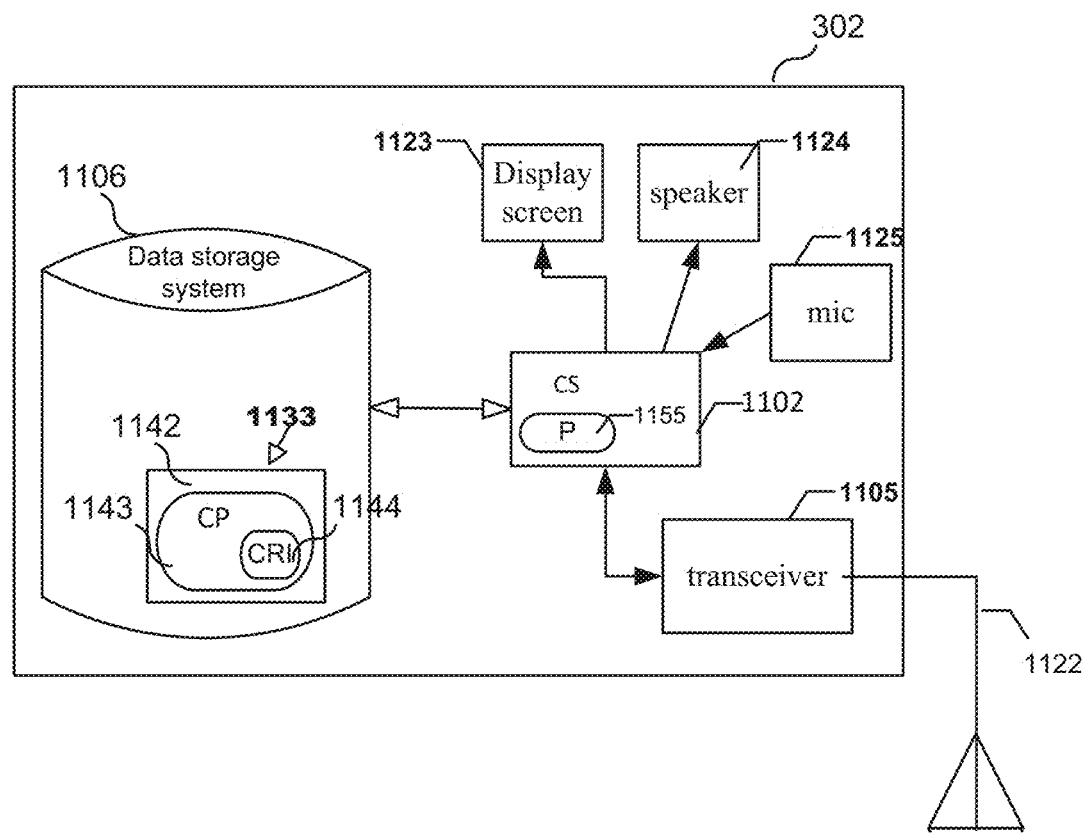
FIG. 11 is a block diagram of a UE according to some embodiments.

FIG. 11 is a block diagram of UE 302 according to some embodiments. As shown in FIG. 11, UE 302 may include or consist of: a computer system (CS) 1102, which may include one or more processors 1155, e.g., a general purpose microprocessor and/or one or more circuits, such as an application specific integrated circuit (ASIC), field-programmable gate arrays (FPGAs), a logic circuit, and the like; a transceiver 1105, coupled to an antenna, 1122 for transmitting and receiving data wireless; and a data storage system 1106, which may include one or more non-volatile storage devices and/or one or more volatile storage devices, e.g., random access memory (RAM). In embodiments where UE 302 includes a processor 1155, a computer program product (CPP) 1133 may be provided. CPP 1133 includes or is a computer readable medium (CRM) 1142 storing a computer program (CP) 1143 comprising computer readable instructions (CRI) 1144. CRM 1142 is a non-transitory computer readable medium, such as, but not limited, to magnetic media, e.g., a hard disk, optical media, e.g., a DVD, solid state devices, e.g., random access memory (RAM), flash memory, and the like. In some embodiments, the CRI 1144 of computer program 1143 is configured such that when executed by computer system 1102, the CRI causes the UE 302 to perform steps described above, e.g., steps described above with reference to the flow charts and message flows shown in the drawings. In other embodiments, UE 302 may be configured to perform steps described herein without the need for a computer program. That is, for example, computer system 1102 may consist merely of one or more ASICs. Hence, the features of the embodiments described herein may be implemented in hardware and/or software. As shown in FIG. 11, UE 302 may include: a display screen 1133, a speaker 1124, and a microphone ("mica"), all of which are coupled to CS 1102.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

DRX Discontinuous reception
eNB Evolved Node B, base station
E-UTRAN Evolved universal terrestrial radio access network
E-UTRA Evolved universal terrestrial radio access
E-UTRA FDD E-UTRA frequency division duplex
E-UTRA TDD E-UTRA time division duplex
LTE Long term evolution
M2M Machine-to-machine
PBCH Physical broadcast channel
PCC Primary component carrier
PCI Physical cell identity
PSS Primary synchronization signal
RAT Radio Access Technology
RRC Radio resource control
RSRP Reference Signal Received Power
RSRQ Reference Signal Received Quality
TDD Time division duplex
UE User equipment
RNC Radio Network Controller
BSC Base station Controller
PCell Primary Cell
HSPA High Speed Packet Access
GSM Global system for mobile communication
UTRA universal terrestrial radio access
UTRA FDD UTRA frequency division duplex
UTRA TDD UTRA time division duplex
WLAN Wireless Local Area Network
GERAN GSM EDGE Radio Access Network
EDGE Enhanced Data rates for GSM Evolution
CDMA2000 Code division multiple access 2000
HRPD High rate packet data
DL Downlink
PDCCH Physical Downlink Control Channel
DMRS Demodulation Reference Signal
PCFICH Physical Control format Indicator
PDSCH Physical Downlink Shared Channel
PHICH Physical Hybrid ARQ Indicator Channel
RE Resource Element
RB Resource Block
RS Reference signal
RRH Remote radio head
CRS Cell specific Reference Signal
SSS Secondary Synchronization Signal
UE User Equipment
UL Uplink

The invention claimed is:

1. A method for adaptive radio link monitoring (RLM), the method comprising:
    a network node obtaining configuration information about a user equipment (UE), wherein the configuration information indicates whether or not the UE has only one receiver;
    the network node adapting, based on whether or not the configuration information about the UE indicates that the UE has only one receiver, a radio transmission parameter associated with a downlink (DL) signal used by the UE for performing the RLM; and
    the network node transmitting the DL signal with the adapted radio transmission parameter to the UE enabling the UE to perform the RLM,
    wherein the adapted radio transmission parameter is a ratio of i) an energy of the DL signal used by the UE for performing the RLM to ii) an average energy of a reference signal,
    the UE is configured such that, in response to the adapting of the radio transmission parameter, the UE maintains the same DL radio link out of sync quality target levels and in sync quality target levels regardless of the UE receiver capability of receiving the DL signal from the network node,
    the out of sync quality target levels indicate one or more levels for declaring that a status of the UE is an out of sync status, and
    the in sync quality target levels indicate one or more levels for declaring that the status of the UE is an in sync status.

2. The method of claim 1, wherein the configuration information indicates that the UE has only one receiver.

3. The method of claim 1, wherein the step of obtaining the configuration information comprises receiving said configuration information from the UE or determining the configuration information based on one or more radio measurements performed by the UE.

4. The method according to claim 1, wherein the obtained configuration information indicates that the UE receiver is capable of mitigating interference received from one or more interfering cells, wherein the mitigating of the interference received from one or more interfering cells includes mitigating interference received at the UE from at least one or more of: a DL data channel, a DL control channel, and DL physical signals.

5. The method according to claim 1, wherein the at least one DL signal includes one or more of: a DL physical signal and a DL physical channel.

6. The method according to claim 5, wherein the DL physical signal is one or more of: a Primary Synchronization Signal (PSS), a Secondary Synchronization Signal (SSS), a Cell specific Reference Signal (CRS), a Channel State Information Reference Signal (CSI-RS), and a Positioning Reference Signal (PRS).

7. The method according to claim 5, wherein the DL physical channel is one or more of: a Physical Downlink Control Channel (PDCCH), a Physical Control Format Indicator Channel (PCFICH), Physical Hybrid ARQ Indicator Channel (PHICH), and an Enhanced Physical Downlink Control Channel (E-PDCCH).

8. The method according to claim 5, wherein the DL physical channel is a Physical Downlink Shared Channel (PDSCH).

9. The method according to claim 1, wherein in response to determining that the configuration information about the UE indicates that the UE has only one receiver, the step of adapting the radio transmission parameter includes
increasing a ratio of energy or power of the DL signal to an average energy or power of a reference signal.

10. The method according to claim 1, wherein when the configuration information indicates that the UE is capable of receiving signals with multiple receivers and/or mitigating interference received from one or more interfering cells, the step of adapting the radio transmission parameter includes
decreasing a ratio of energy or power of the DL signal to an average energy or power of a reference signal.

11. The method according to claim 1, wherein the adaption of the at least one parameter related to the at least one DL signal is performed according to one or more predefined rules.

12. The method according to claim 1, wherein the adaption is further based on whether DL coverage enhancement is applied on the DL signal transmitted by the network node for the UE.

13. The method according to claim 1, wherein
the obtained receiver configuration indicates that the UE supports a plurality of receiver types for receiving signals from the network node, and
the network node configures the UE to operate with one of the plurality of receiver types supported by the UE.

14. The method according to claim 1, further comprising steps of:
the network node determining, based on the obtained configuration information, whether the UE is operating in an enhanced coverage mode; and
the network node adapting, based on the determination that the UE is operating in the enhanced coverage mode, at least one radio transmission parameter associated with at least one downlink (DL) signal used by the UE for performing the RLM.

15. A network node for adaptive radio link monitoring (RLM), the network comprising:
a computer system comprising a processor;
a network interface coupled to the computer system; and
a data storage system coupled to the computer system, wherein the computer system is configured to:
obtain configuration information about a user equipment (UE), wherein the configuration information indicates whether or not the UE has only one receiver,
adapt, based on whether or not the configuration information about the UE indicates that the UE has only one receiver, a radio transmission parameter associated with at least one downlink (DL) signal used by the UE for performing the RLM, and
employ the network interface to transmit the at least one DL signal with the adapted radio transmission parameter to the UE enabling the UE to perform the RLM, wherein the adapted radio transmission parameter is a ratio of an energy of the DL signal to an average energy of a reference signal,
the UE is configured such that, in response to the adapting of the radio transmission parameter, the UE maintains the same DL radio link out of sync quality target levels and in sync quality target levels regardless of the UE receiver capability of receiving the DL signal from the network node,
the out of sync quality target levels indicate one or more levels for declaring that a status of the UE is an out of sync status, and
the in sync quality target levels indicate one or more levels for declaring that the status of the UE is an in sync status.

16. The network node according to claim 15, wherein the data storage system comprises a computer readable medium coupled to the processor, said computer readable medium containing instructions executable by the processor.

17. The network node according to claim 15, wherein the configuration information indicates that the UE has only one receiver.

18. The network node according to claim 15, wherein the obtaining the configuration information comprises receiving said configuration information from the UE or determining the configuration information based on one or more radio measurements performed by the UE.

19. The network node according to claim 15, wherein the obtained configuration information indicates that the UE receiver is capable of mitigating interference received from one or more interfering cells, wherein the mitigating of the interference received from one or more interfering cells includes mitigating interference received at the UE from at least one or more of: a DL data channel, a DL control channel, and DL physical signals.

20. The network node according to claim 15, wherein the at least one DL signal includes one or more of: a DL physical signal and a DL physical channel.

21. The network node according to claim 20, wherein the DL physical signal is one or more of: a Primary Synchronization Signal (PSS), a Secondary Synchronization Signal (SSS), a Cell specific Reference Signal (CRS), a Channel State Information Reference Signal (CSI-RS), and a Positioning Reference Signal (PRS).

22. The network node according to claim 20, wherein the DL physical channel is one or more of: a Physical Downlink Control Channel (PDCCH), a Physical Control Format Indicator Channel (PCFICH), Physical Hybrid ARQ Indicator Channel (PHICH), and an Enhanced Physical Downlink Control Channel (E-PDCCH).

23. The network node according to claim 20, wherein the DL physical channel is a Physical Downlink Shared Channel (PDSCH).

24. The network node according to claim 15, wherein the network node is configured to increase a ratio of energy of the DL signal to an average energy of a reference signal in response to determining that the configuration information about the UE indicates that the UE has only one receiver.

25. The network node according to claim 15, wherein the network node is configured to decrease a ratio of energy of the DL signal to an average energy of a reference signal when the configuration information indicates that the UE is capable of receiving signals with multiple receivers and/or mitigating interference received from one or more interfering cells.

26. The network node according to claim 15, wherein the adaption of at the least one parameter related to the at least one DL signal is performed according to one or more predefined rules.

27. The network node according to claim 15, wherein the adaption is further based on whether DL coverage enhancement is applied on the DL signal transmitted by the network node for the UE.

28. The network node according to claim 15, wherein
the obtained receiver configuration indicates that the UE supports a plurality of receiver types for receiving signals from the network node, and
the network node configuring the UE to operate with one of the plurality of receiver types supported by the UE.

29. The network node according to claim 15, wherein the network node is further arranged to:
determine, based on the obtained configuration information, whether the UE is operating in an enhanced coverage mode; and
adapt, based on the determination that the UE is operating in the enhanced coverage mode, at least one radio transmission parameter associated with at least one downlink (DL) signal used by the UE for performing the RLM.

30. A computer product for adaptive radio link monitoring (RLM), the computer product comprising a non-transitory computer readable medium storing computer instructions for:
obtaining configuration information about a user equipment (UE), wherein the configuration indicates whether or not the UE has only one receiver;
adapting, based on the whether or not the configuration information about the UE indicates that the UE has only one receiver, a radio transmission parameter associated with at least one downlink (DL) signal used by the UE for performing RLM; and
utilizing the at least one adapted radio transmission parameter for performing RLM with the UE,
wherein the adapted radio transmission parameter is a ratio of an energy of the DL signal to an average energy of a reference signal,
the UE is configured such that, in response to the adapting of the radio transmission parameter, the UE maintains the same DL radio link out of sync quality target levels and in sync quality target levels regardless of the UE receiver capability of receiving the DL signal from the network node,
the out of sync quality target levels indicate one or more levels for declaring that a status of the UE is an out of sync status, and
the in sync quality target levels indicate one or more levels for declaring that the status of the UE is an in sync status.

31. A method for adaptive radio link monitoring, the method comprising:
a user equipment (UE) receiving, from a network node, at least one down link (DL) signal having at least one parameter adapted for use by the UE;
the UE performing radio link monitoring (RLM) on the DL signal received from the network node,
wherein the adapted parameter includes a ratio of an energy of the DL signal to an average energy of a reference signal,
the adapted parameter was adapted based on whether the UE has only one receiver, and
the method further comprises, in response to determining that a DL signal is adapted for use by the UE, the UE substantially maintaining the same DL radio link out sync quality targets and in sync quality targets regardless of the UE receiver configuration, wherein the out of sync quality target levels indicate one or more levels for declaring that a status of the UE is an out of sync status, and the in sync quality target levels indicate one or more levels for declaring that the status of the UE is an in sync status.

32. The method according to claim 31, wherein the UE has only one receiver.

33. The method according to claim 31, further comprising the steps of:
the UE determining if the UE is operating or configured to operate in DL coverage enhancement mode; and
the UE adapting one or more RLM related parameters or RLM procedures based on pre-determined rules, if operating in DL enhanced coverage mode.

34. A user equipment (UE) served by a network node for performing a radio link monitoring (RLM) by monitoring the downlink quality of signals transmitted by the network node, the UE comprising:
a computer system comprising a processor;
a transceiver coupled to the computer system; and
a data storage system coupled to the computer system, wherein the computer system is configured to:
employ the transceiver to receive, from the network node, at least one downlink (DL) signal having at least one parameter adapted for use by the UE, and
perform radio link monitoring (RLM) on the DL signal received from the network node, wherein the adapted parameter is a ratio of an energy or power of the DL signal to an average energy or power of a reference signal,
the adapted parameter was adapted based on whether the UE has only one receiver, and
the UE is further arranged to, in response to determining that a DL signal is adapted for use by the UE, the UE substantially maintains the same DL radio link out sync quality targets and in sync quality targets regardless of the UE receiver configuration, wherein the out of sync quality target levels indicate one or more levels for declaring that a status of the UE is an out of sync status, and the in sync quality target levels indicate one or more levels for declaring that the status of the UE is an in sync status.

35. The UE according to claim 34, wherein the data storage system comprises a computer readable medium coupled to the processor, said computer readable medium containing instructions executable by the processor.

36. The UE according to claim 34, wherein the UE has only one receiver.

37. The UE according to claim 34, wherein the UE is further arranged to:
determine if the UE is operating or configured to operate in DL coverage enhancement mode; and
adapt one or more RLM related parameters or RLM procedures based on pre-determined rules, if operating in DL enhanced coverage mode.

38. A computer product comprising a non-transitory computer readable medium storing computer instructions for arranging a user equipment (UE) to perform adaptive radio link monitoring, the computer instructions comprising:

instructions for enabling the UE to receive, from a network node, at least one downlink DL signal having a radio transmission parameter adapted for use by a user equipment (UE) for performing the RLM depending upon whether the UE has only one receiver; and instructions for causing the UE to perform RLM on a DL signal received from the network node, wherein the adapted radio transmission parameter is a ratio of an energy of the DL signal to an average energy of a reference signal; and instructions for causing the UE to, in response to determining that a DL signal is adapted for use by the UE, substantially maintain the same DL radio link out sync quality targets and in sync quality targets regardless of the UE receiver configuration, wherein the out of sync quality target levels indicate one or more levels for declaring that a status of the UE is an out of sync status, and the in sync quality target levels indicate one or more levels for declaring that the status of the UE is an in sync status.

* * * * *